United States Patent [19]
Sahlberg

[11] Patent Number: 5,467,859
[45] Date of Patent: Nov. 21, 1995

[54] VIBRATOR FOR TRANSPORTING ARTICLES

[75] Inventor: Karl M. Sahlberg, Grillby, Sweden

[73] Assignee: Vibro Industries, Inc., Fogelsville, Pa.

[21] Appl. No.: 187,299

[22] Filed: Jan. 19, 1994

[51] Int. Cl.$^6$ ............................................. B65G 25/00
[52] U.S. Cl. ............................................ 198/750.7; 91/329
[58] Field of Search .......................... 198/750.1, 750.5, 198/750.7; 91/329

[56] References Cited

U.S. PATENT DOCUMENTS

| | | | |
|---|---|---|---|
| 4,192,419 | 3/1980 | Brodin | 198/750.7 |
| 4,505,380 | 3/1985 | McLemore et al. | 198/750.7 |
| 4,593,603 | 6/1986 | Johnson | 91/265 |
| 5,361,706 | 11/1994 | Kunczynski | 198/750.7 X |

*Primary Examiner*—James R. Bidwell
*Attorney, Agent, or Firm*—Eckert Seamans Cherin & Mellott

[57] ABSTRACT

A vibrator for transporting articles has a base, a sliding carriage having an article-carrying surface, a piston arrangement with two expansion chambers in the base for vibrating the carriage, and a pneumatic valve assembly operated by the piston arrangement. Preferably, two pistons are oppositely aligned on a common axis and bear outwardly against the carriage. The pneumatic valve assembly includes a pair of spaced cam rods and a crossbar extending between the cam rods at their midpoints. The cam rods are parallel to the axis of the pistons, slide in unison with the carriage, and cooperatively push the crossbar between opposite extreme positions. The crossbar switches the air flow directions for the power and exhaust strokes of each piston. Air flow to or from one of the expansion chambers is throttled such that the carriage is moved more forcefully in one direction than in the other. Articles on the article-carrying surface are incrementally displaced in the direction opposite to the more forceful stroke.

16 Claims, 5 Drawing Sheets

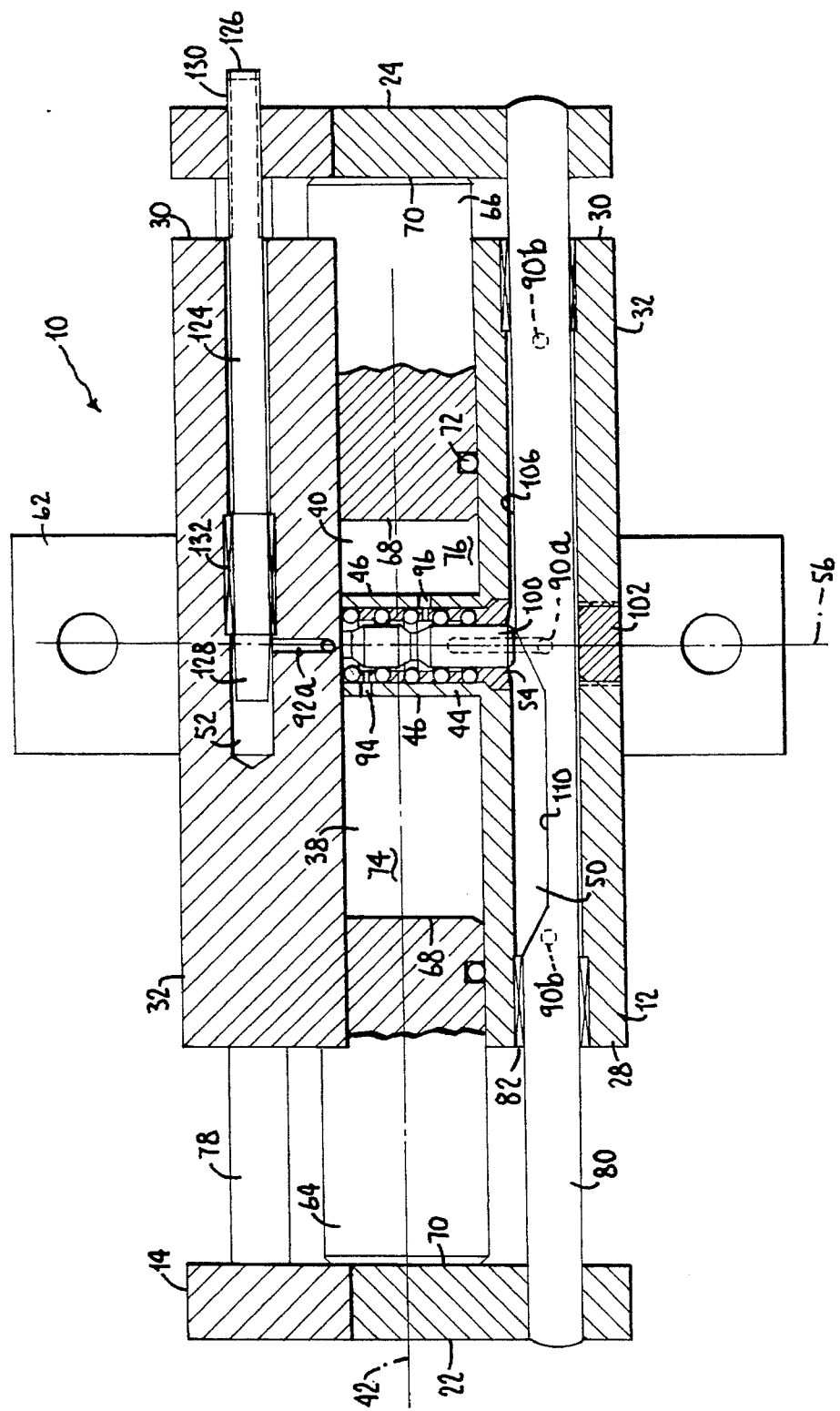

VIBRATOR FOR TRANSPORTING ARTICLES

BACKGROUND OF THE INVENTION

1. Field of the Invention

The invention relates to the field of vibrators for transporting articles across an article-carrying surface by producing an asymmetrically timed vibratory motion of the surface relative to a fixed base. A piston/cylinder arrangement and an associated pneumatic valve assembly move a sliding carriage coupled to the article-carrying surface such that the sliding carriage accelerates relatively more quickly when moving in one direction and more slowly when moving in the other direction.

Preferably, two pistons are aligned on a common axis and have power strokes in opposite directions from respective expansion chambers at their inside ends. The pneumatic valve assembly includes a pair of spaced cam rods and a crossbar extending between the cam rods at about their midpoints. The cam rods are mutually parallel with the axis of the pistons, slide in unison with the carriage, and cooperatively push the crossbar between opposite extreme positions. The crossbar controls the air flow for the power and exhaust strokes of each piston, at half cycles that are out of phase from each other. The half cycles are differently timed by a difference in the air discharges from the respective pistons. Due to inertia and friction, articles on the article-carrying surface are more readily displaced relative to the fixed base in the direction in which the carriage is more slowly accelerated, because friction is more likely then to hold the articles on the accelerating surface notwithstanding their inertia.

2. Prior Art

Vibrators are known in the art and have article-carrying surfaces that vibrate rapidly in back and forth strokes. Vibrators are useful for moving articles, such as screws, from areas that are inaccessible or for moving articles that are inconvenient to move by other means. For example, a typical application is to remove material from under a machine or a punch press. Such vibrators can operate on compressed air, i.e., without electrical connections, permitting their use in areas where electrical currents and/or voltages are to be avoided.

Springs are not preferred for vibrators, which advantageously operate for long periods of time over many many cycles, often at high cyclic-rates. Under such conditions, springs are subject to degradation and failure, and consequently are undesirable. A pneumatic arrangement with an oppositely displaceable piston/cylinder arrangement, however, is durable and long lived.

An exemplary vibrator of this type is disclosed, for example, in Johnson U.S. Pat. No. 4,593,603. This vibrator has a base with opposite ends having piston bores or chambers. Pistons are disposed in the piston chambers and extend in opposite directions. A carriage overlays the base and has flanges on opposite edges fastened to the outer ends of the pistons. The carriage and pistons move in unison relative to the base.

In Johnson the pistons are of different diameters. Both pistons carry an O-ring at the middle. For each piston, an expansion chamber is defined between the closed end of the piston bore and the O-ring. The larger diameter piston has a threaded aperture in its inner end (i.e., its head), a valve mechanism is coupled to the threaded aperture and disposed entirely inside the expansion chamber of the larger diameter piston bore. The valve mechanism controls the intake and exhaust of compressed air for the two expansion chambers.

The action of the valve mechanism causes the two pistons to reciprocate. The expansion chamber of the smaller diameter piston bore is supplied compressed air through a relatively smaller hole, while the expansion chamber of the larger diameter piston bore is supplied air through a relatively larger hole. Acceleration of the larger diameter piston from the retracted to the extended position therefor is faster than the acceleration of the smaller diameter piston. Thus the pistons accelerate the carriage asymmetrically. Consequently, the asymmetrically-accelerated article-carrying surface of the carriage transports articles in one direction.

More particularly, during the slower acceleration in one direction, friction between the articles and the article-carrying surface tends to better retain the articles on the surface as the surface moves. The articles accelerate together with the surface and are displaced relative to the base by an incremental distance during the stroke. During the faster acceleration in the opposite direction, the inertia of the articles is more likely to overcome their frictional connection with the surface, in which case the accelerating article-carrying surface moves beneath the relatively stationary articles. The overall effect is that the articles are transported in the same direction as the slow acceleration stroke in short repetitive increments. The operating principles of vibrators and the exemplary vibrator above are disclosed more fully in Johnson U.S. Patent No. 4,593,603, which is hereby incorporated in its entirety.

It would be advantageous if certain improvements could be made on the known vibrator as described. A shorter and more compact carriage arrangement could be provided if the valve mechanism could be moved out of the expansion chamber. Also, improvements could be made by providing a means to adjust the ratio of fast acceleration to slow acceleration so as to achieve the most effective movement to obtain article motion. These and other aspects are addressed according to the present invention.

SUMMARY OF THE INVENTION

It is an object of the invention to provide a vibrator with a relatively compact carriage.

It is another object of the invention to provide a vibrator with a valve mechanism located outside of the expansion chambers.

It is still another object of the invention to provide a vibrator with a valve coupled with the pistons via mechanical links and cams, but preferably avoiding springs.

It is still a further object of the invention to provide a vibrator with an adjustable regulator valve.

These and other objects are accomplished by a vibrator for transporting articles. The vibrator has a carriage and a base. The carriage has an article carrying surface. The base has spaced end walls. Recessed in the base is an inlet, a vent, piston bores in each end, and a manifold.

Preferably, two cylindrical pistons are disposed in the piston bores and extend in directions opposite to each other along a common axis. The pistons carry seals adjacent their inner ends such that an expansion chamber is defined in the piston bore on the side of the seal toward the closed end of the piston bore. The manifold includes conduits extending to each one of the inlet, the vent, and the two expansion chambers. The base and the carriage are coupled together for relative movement therebetween. The carriage and the pistons are coupled to move in unison.

The valve mechanism of the vibrator is outside of the expansion chambers. The valve mechanism is disposed in the manifold and is operated by movements of the pistons to move between a first position where one expansion chamber communicates with the inlet as the other expansion chamber communicates with the vent, and a second position where said one expansion chamber communicates with the vent and said other expansion chamber communicates with the inlet.

An air-flow constriction is associated with one of the two expansion chambers for regulating a rate of air flow into the expansion chamber and/or air flow out of the expansion chamber such that the pistons move the carriage relatively more forcefully in one direction and relatively less forcefully in the other.

The valve mechanism preferably comprises a follower member having opposite ends and two spaced cam members flanking the follower member. Each cam member has a cam surface abutting one of the opposite ends of the follower member. The cam members are elongated and extend mutually parallel to the common axis of the pistons, and are interconnected with the pistons to move in unison with the carriage and pistons.

The follower member moves between the first and second positions along an axis that is generally perpendicular to the common axis of the pistons. Each cam surface defines a concavity. The cam members are spaced apart and the concavities are offset relative to each other such that reciprocating the cam members causes the follower member to reciprocate between the first and second positions.

This follower member preferably has a central portion between the opposite ends, generally defining a sliding surface. The manifold has a cooperative surface closely spaced from the sliding surface, and this cooperative surface has a plurality of apertures leading to the conduits which extend to the inlet, vent and expansion chambers. A plurality of seals are provided between the sliding surface and the cooperative surface to isolate the apertures from one another. The follower member is provided with recesses in the sliding surface to permit selected apertures to communicate with one another, wherein a change in position of the follower member varies which apertures can communicate with one another.

The base is preferably formed from an integral block of material. In this integral block of material, the piston bores are positioned together such that their closed ends define a partition therebetween. The manifold includes a bore recessed in the partition along an axis perpendicular to the common axis of the piston bores. The base includes two bores extending mutually parallel to the common axis of the piston bores and generally flanking them as well. These flanking bores intersect the manifold bore at spaced locations.

The cam members preferably comprise rods disposed in the flanking bores. The follower member preferably comprises a rod disposed in the manifold bore such that the follower rod extends between and abuts against one or the other or both of the spaced cam rods. Each cam rod has a concavity, and is interconnected to move in unison with the carriage and pistons. Together the cam rods are oriented and the concavities are arranged offset relative to each other such that reciprocation of the cam rods causes the follower rod to reciprocate between the first and second positions.

Preferably, the air-flow constriction is adjustable to control the rate of deceleration of the flow air past this constriction, thereby permitting adjustment of the ratio of fast acceleration to slow acceleration. In any event, the acceleration is greater and the time required to complete a stroke is shorter, namely the time until the cam rods operate the follower rod at the end of a stroke, in one direction than in the other.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 4 is a partial sectional view taken along offset line 4—4 in FIG. 2;

FIG. 5 is an sectional view taken along line 5—5 of FIG. 1; and,

DETAILED DESCRIPTION OF THE PREFERRED EMBODIMENTS

Figure 1:
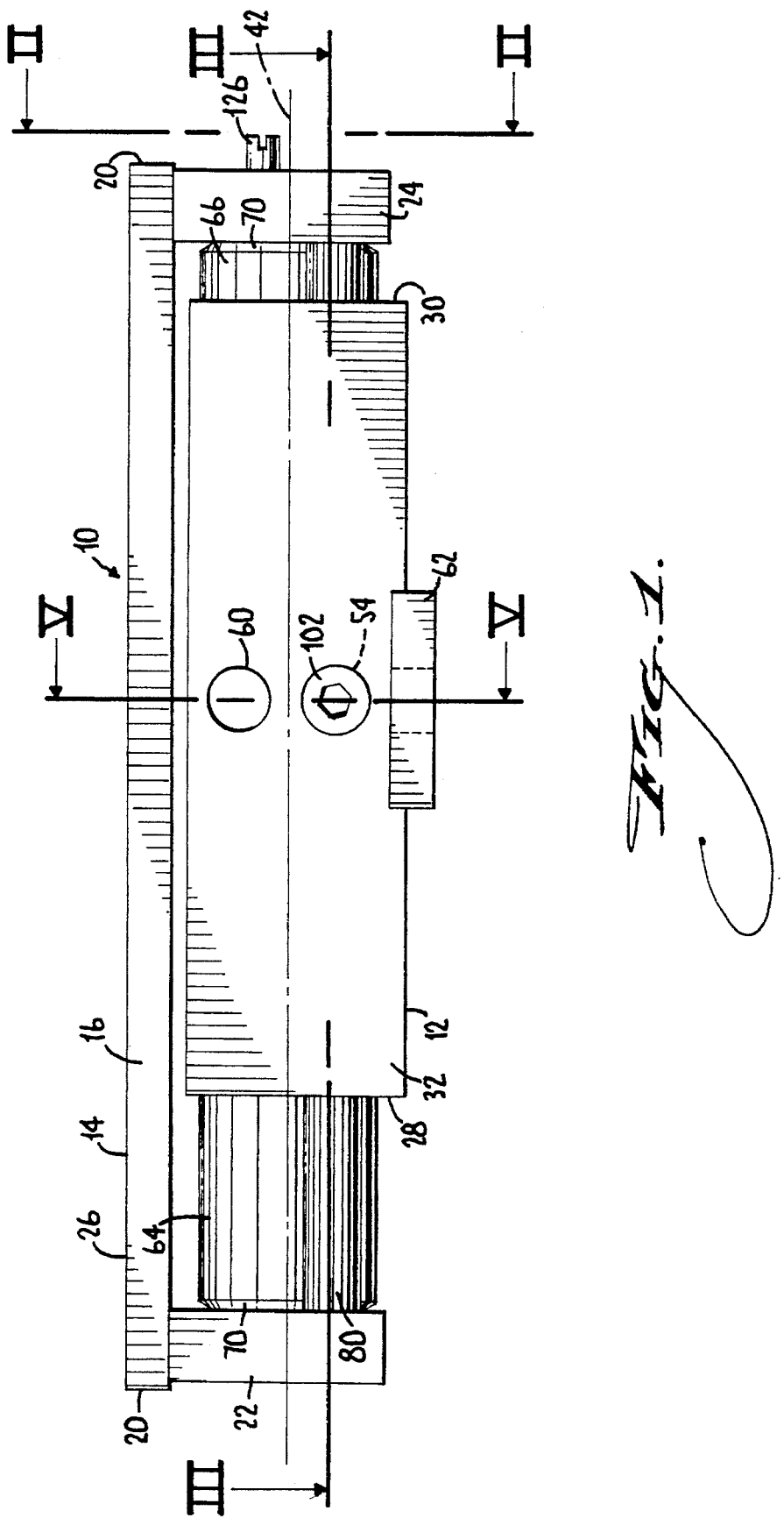
FIG. 1 is a side elevational view of a vibrator for transporting articles in accordance with the invention.
Figure 2:
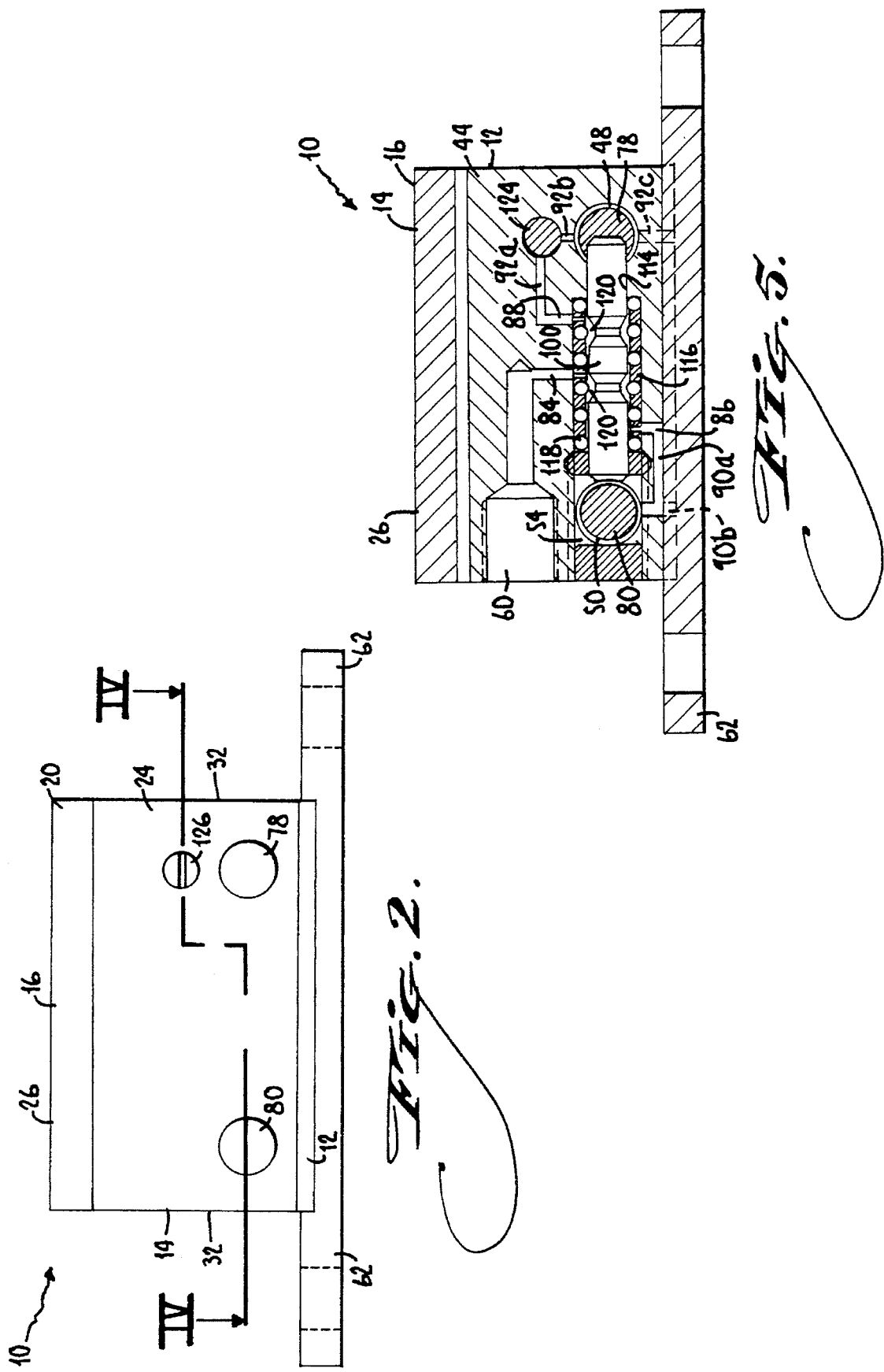
FIG. 2 is an elevational view in the direction of arrows 2—2 in FIG. 1.

In FIG. 1, a vibrator 10 for transporting articles (not shown) comprises a fixed base 12 and a carriage 14 above the base. The base 12 and carriage 14 are coupled together for relative movement. The carriage 14 comprises a horizontal plate 16 with opposite edges 20 and opposite flange portions 22 and 24 depending from the opposite edges 20 respectively. The horizontal plate 16 defines an article-carrying surface 26.

At least one piston is driven in a reciprocating motion by alternating cycles of pressure and exhaust applied respectively to two expansion chambers 74, 76. Preferably, two pistons 64, 66 are drivable outwardly from central expansion chambers as shown in FIG. 3, the two pistons being attached to the carriage 14 such that the piston(s) and carriage move as a unit.

Figure 3:
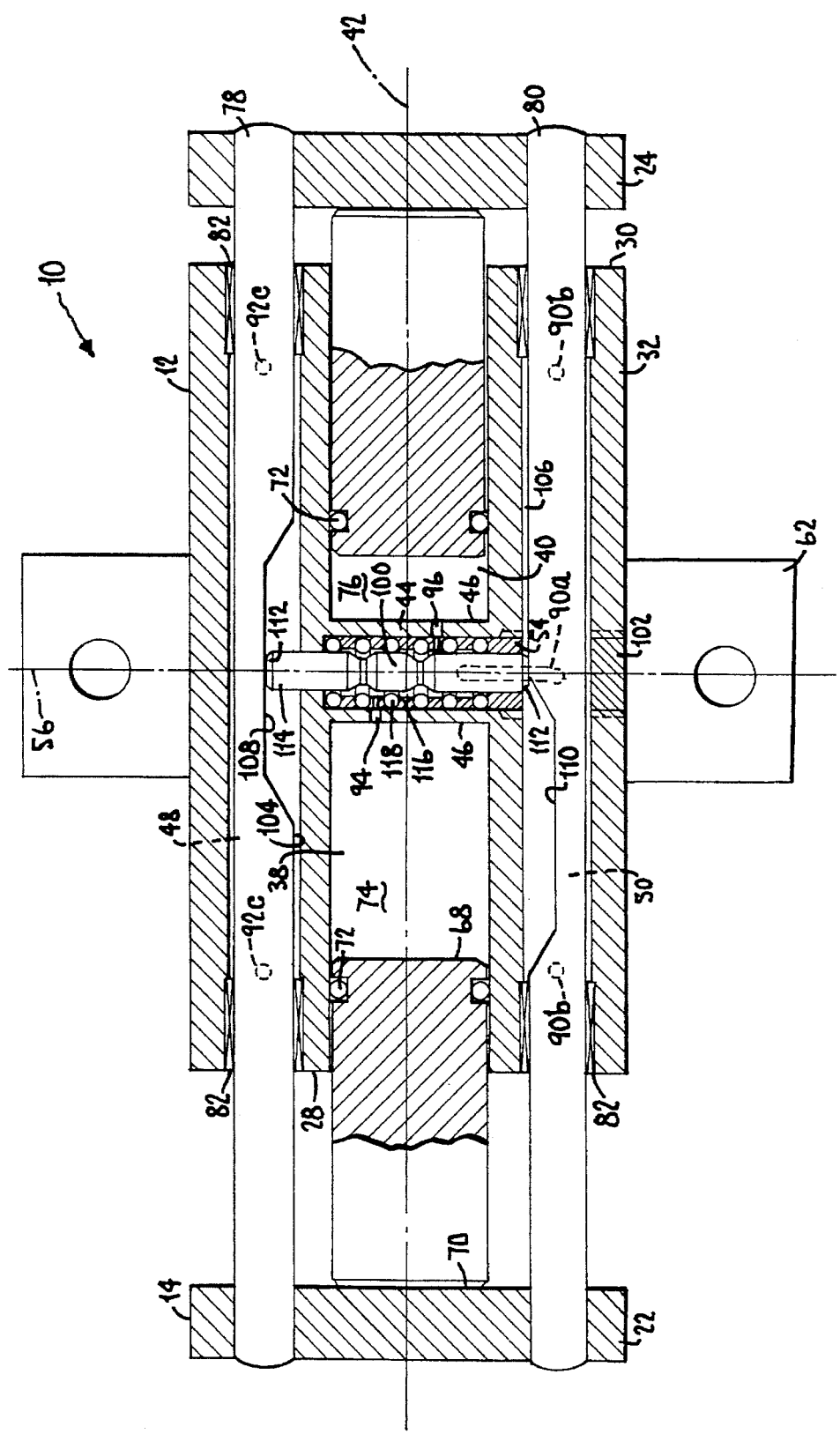
FIG. 3 is a partial sectional view taken along line 3—3 in FIG. 1.

With reference to FIG. 3, the base 12 can comprise an integral block of material such as of steel or the like. The base has opposite end walls 28 and 30 spaced between opposite sidewalls 32. Each end wall 28, 30 is recessed inwardly with an open piston bore 38, 40. The piston bores 38 and 40 are preferably cylindrical and have the same diameter and are oriented on a common axis 42. A partition 44 is defined between the closed ends 46 of bores 38, 40. The base 10 is recessed with two bores 48 and 50 extending through the opposite end walls 28 and 30. The through bores 48 and 50 extend along axes that are parallel to the common axis 42 of the piston bores 38 and 40. These through bores 48 and 50 flank the common axis 42 and are spaced from the common axis 42. A closed-end bore 52 (see FIG. 4) is recessed in one end wall 30.

The partition 44 of the base 12 is also bored. A bore 54 defining a manifold extends in from one sidewall of the base along an axis 56 perpendicular to and relatively lower than the common axis 42 of the piston bores 38 and 40. Above the manifold bore 54, an air inlet 60 (FIG. 5) is bored halfway through the block 12. It will be appreciated that designations such as "above" and "below" are used herein merely for convenience in describing the apparatus shown, and the invention is not limited to a particular orientation. The base 12 is fused to a bracket 62 for mounting the vibrator 10 to a stand (not shown).

Opposite cylindrical pistons 64 and 66 are disposed in the opposite piston bores 38 and 40 and extend opposite one another from retracted positions to extended positions. Each piston 64, 66 has an inner end 68 and an outer end 70. Each piston is recessed with an O-ring groove near the respective inner end 68 for carrying an O-ring 72 to obtain a seal between the piston and the respective piston bore. An expansion chamber 74, 76 is defined in each piston bore 38, 40 between the seal 72 and the closed end 46 of the piston bore 38, 40. The outer ends 70 of the pistons bear against and preferably are attached to the opposite flanges 22 and 24 of the carriage 14.

Elongated rods 78 and 80 are disposed in the through bores 48 and 50 in the base 12 for reciprocating movement therein. The elongated rods 78 and 80 are slidingly supported by and form seals with bearings 82, press-formed in the through bores 48 and 50 at each of the opposite end walls 28, 30. The elongated rods 78, 80 extend into holes in and are fixed to the opposite flanges 22, 24 such that the pistons 64 and 66, rods 78 and 80, and carriage 14 form a unit that moves as one.

With general reference to FIG. 5, the manifold bore 54 has five openings (see also FIG. 3) communicating with conduits extending away from it. A central opening 84 leads to the air-supply inlet 60. The outer two openings 86 and 88 both extend to respective vents 90a/90b and 92a/92b/92c in base 12. Air exhausting through the rightmost opening in FIG. 5 enters the closed-end bore 52 via a horizontal segment 92a, but departs via a vertical segment 92b that terminates in through bore 48. Such air then branches to exhaust to atmosphere via one of two vertical segments 92c (see also FIG. 3). Air exhausting through the leftmost opening enters the through bore 50 via vent 90a, and then branches to exhaust to atmosphere via one of two vertical segments 90b (see also FIG. 3). The remaining two openings 94 and 96 (FIG. 3) extend to one or the other of the opposite expansion chambers 74 and 76.

Returning to FIG. 3, a valve member 100 is slidably disposed in the manifold bore 54. The valve member 100 cooperates with the pair of elongate rods 78 and 80 in the fashion that a follower cooperates with cam surfaces. A plug 102 is threadably secured in the sidewall 32 the base 12 to protect the elongate rods 78 and 80 and follower 100 from abrasive particles.

The elongate rods 78 and 80 define opposed cam surfaces 104 and 106. Each cam surface 104, 106 has a concavity 108, 110 therein. The valve member or follower 100 extends between and has opposite ends 112 abutting against the cam surfaces 104 and 106 of the elongate rods 78 and 80. The elongate rods 78 and 80 are oriented with respect to each other and the concavities 108 and 110 are offset relative to each other such that reciprocation of the elongate rods 78 and 80 causes the follower rod 100 to reciprocate along a line perpendicular to the elongate rods 78 and 80 between first and second positions.

The follower 100 operates as a valve switch. For this purpose, follower 100 has a generally cylindrical central portion between the opposite ends thereof defining a sliding surface 114. The manifold bore 54 carries a series of ring segments 116, all but one of which are press-formed at spaced positions to define a plurality of O-ring slots. The segment 116 which is on the end and adjacent the elongate rod 80 is threadably secured in place, but likewise defines an O-ring slot with the next ring 116 in the series. A plurality of O-rings 118 are disposed in these O-ring slots. Five of the ring segments have holes correspondingly positioned over the five openings 84, 86, 88, 94 and 96 to permit the openings to communicate with the manifold bore 54. Generally, the follower member 100 cooperates with the O-rings 118 to isolate the openings 84, 86, 88, 94 and 96 from communicating with one another. However, the follower member 100 is provided with a pair of annular recesses 120 (FIG. 5) in the sliding surface 114 to permit two adjacent openings of 84, 86, 88, 94 and 96 to communicate with one another.

It is evident that a change in position of the follower member 100 varies which two adjacent openings of 84, 86, 88, 90 and 92 communicate with one another. In case of a first extreme position (e.g., FIGS. 1–5), where the follower 100 is positioned against the concavity 108 of the cam surface 104, one expansion chamber 74 communicates with the air-supply inlet 60 as the other expansion chamber 76 communicates with the vent 92 therefor. In a second and opposite extreme position (not shown), the follower 100 is positioned against the concavity 110 of the cam surface 106. Expansion chamber 74 then communicates with the vent 90 and the other expansion chamber 76 communicates with the air-supply inlet 60. By this arrangement, air can be supplied at pressure to the inlet 60. Carriage 14 vibrates back and forth as cam surfaces 104 and 106 position the follower 100 in the first and second extreme positions in sequence.

In the figures, the carriage 14 is traveling to the left (FIGS. 1, 3 and 4) but has just begun to decelerate to a full stop. The carriage reverses and accelerates in the opposite direction (i.e., to the right) until the concavity 108 of cam surface 104 positions the follower 100 in the second extreme position (not shown). The carriage then reverses again and accelerates back, continuing to reciprocate indefinitely so long as the air supply is maintained.

FIG. 4 shows that the vent 92a, 92b, 92c, associated with the expansion chamber 76, has a segment 92a exhausting into the closed-end bore 52. The closed-end bore 52 coacts with a valve stem 124 to provide a regulating valve 126. The valve stem 124 is tapered on one end 128 and has a threaded portion 130 at the opposite end. The valve stem is adjustably retained in the adjacent flange 24 so that, generally, the valve stem 124 moves in unison with the carriage 14, except that adjustment is possible in the relative positions between the flange 24 and valve stem 124. The valve stem 124 carries a slide-bearing 132 adjacent its tapered end 128, disposed thereon like a collar.

The regulating valve 126 adjustably throttles air exhausting from the expansion chamber 76 via vent 92a, because the air flows through a constriction defined at the tapered end 128. As a result, the carriage 14 accelerates relatively slower while moving to the right (FIG. 1, 3 and 4) than while moving to the left.

Adjustment of the regulating valve 126 changes the ratio of fast acceleration (while accelerating to the left in FIGS. 1, 3 and 4) to slow acceleration (to the right). The regulating valve 126 is adjustable by turning the threaded portion 130 in the flange 24 to change the relative axial-position of the stem 124 to the flange 24. In FIG. 4, the stem is shown in an axial position relative to the flange that corresponds to a great degree of constriction by the tapered end 128 in the closed-end bore 52 at an axial-position of the vent segments 92a and 92b. FIG. 4 shows the follower 100 an instant after the follower 100 has just been positioned in the first extreme position. Decreasing the degree that the tapered end 128 constricts the flow of air from segment 92a to 92b (via the closed-end bore 52 when carriage 14, follower 100, and pistons 64 and 66 are positioned as shown) increases acceleration rate of the carriage while moving right. The decrease in the degree that the tapered end 128 constricts the flow of air from segment 92a to 92b is obtained by turning the valve stem 124, to move the valve stem 124 right (in FIG. 4) relative to the flange 24. In sum, the adjustable regulating valve 126 provides control over the rate of acceleration to the right, and consequently provides adjustment over the ratio of fast acceleration (constant for air supplied at constant pressure) to slow acceleration (adjustable even for air supplied at constant pressure).

Figure 6:
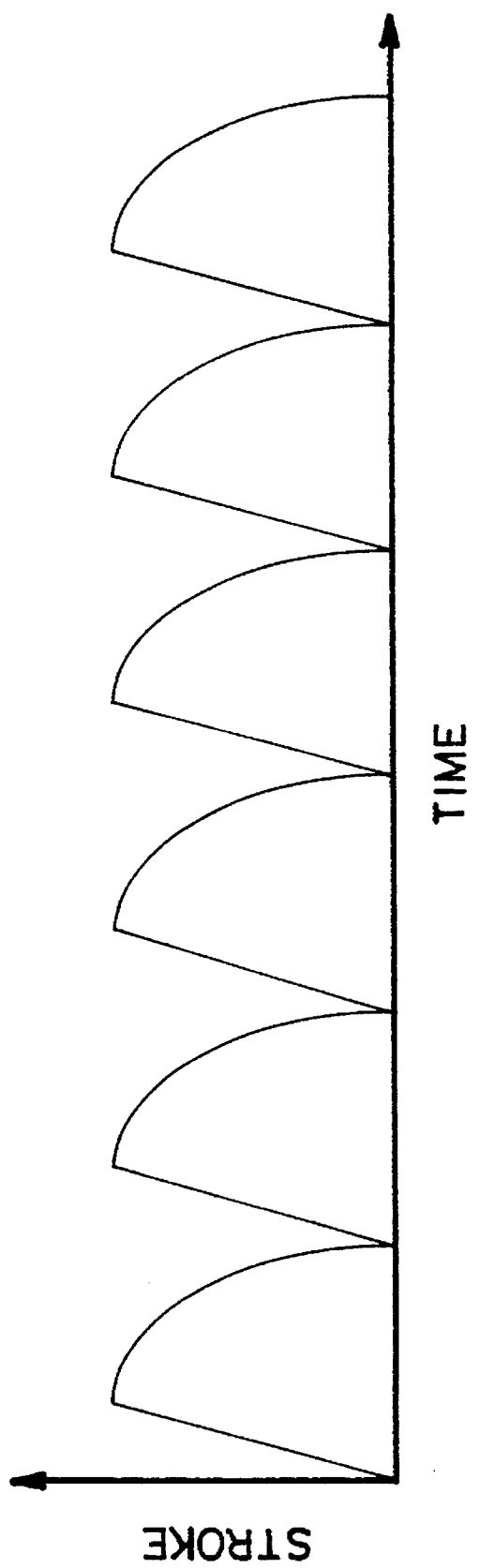
FIG. 6 is diagram of position vs. time, showing the motion of the carriage of the vibrator.

FIG. 6 shows a displacement-time diagram for the article-carrying surface 26. Displacement of the article-carrying surface 26 is charted on the vertical axis as time is charted on the horizontal axis. The article-carrying surface 26 moves faster and completes a stroke more quickly in one direction than in the other direction. Friction between articles and the article carrying surface 26 is generally more able to retain the articles against the surface 26 during slow acceleration, such that the articles are transported an incremental distance (e. g., the distance of the stroke). However, under higher acceleration during the quick return movement, the inertia of the articles tends to exceed the retaining force due to friction between the articles and the surface 26, and the articles tend to stay in place while the surface 26 slides underneath. Whereas the ratio of faster to slower acceleration is adjustable, the vibrator can be set to obtain the transporting motion needed for particular types of articles, which in overall effect are transported in one direction via a series of incremental steps.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A vibrator for transporting articles, comprising:

a carriage having an article-carrying surface;

a base having spaced ends and defining an inlet, a vent, a piston cavity and a manifold, the carriage being attached to the base;

a piston arrangement disposed in the piston cavity for reciprocating movement between two positions, the piston arrangement bearing on the carriage;

at least one seal between the piston arrangement and the piston cavity, the piston arrangement, the seal and the piston cavity forming two expansion chambers that are respectively enlarged and contracted with movement of the piston arrangement, the manifold communicating with the inlet, the vent, and the expansion chambers for supplying and exhausting air to the expansion chambers;

a mechanism outside of the expansion chambers, associated with the manifold and operated by the piston arrangement to move between a first position in which one said expansion chamber communicates with the inlet and the other said expansion chamber communicates with the vent, and a second position in which said one expansion chamber communicates with the vent and said other expansion chamber communicates with the inlet, whereby the piston arrangement is reciprocated; and, regulating means, associated with one of the expansion chambers, for regulating one of air flow into said one expansion chamber and air flow out from said one expansion chamber, such that the piston arrangement and the carriage move relatively more forcefully in one of the opposite directions than the other, and articles on the surface are transported in a direction opposite thereto.

2. The vibrator of claim 1, comprising two pistons arranged in two opposed piston cavities, the expansion chambers being defined at a central end of the pistons, and the pistons each bearing against the carriage at outer ends.

3. The vibrator of claim 1, wherein:

the mechanism outside of the expansion chamber comprises a follower member having opposite ends and two spaced cam members flanking the follower member, each cam member having a cam surface abutting one of the opposite ends of the follower member;

the cam members being interconnected to move in unison with the carriage and the piston arrangement.

4. The vibrator of claim 3, wherein:

the follower member operates between the first and second positions along an axis that is generally perpendicular to the elongated cam members; and each cam surface defines a concavity;

the cam members being spaced apart and the concavities being arranged offset relative to each other such that reciprocation of the cam members causes the follower member to reciprocate between the first and second positions.

5. The vibrator of claim 4, wherein:

the follower member has a central portion between the opposite ends thereof generally defining a sliding surface; and, the manifold has a cooperative surface closely spaced from the sliding surface, the cooperative surface defining a plurality of apertures, each aperture being in communication with one of the inlet, the vent, and the expansion chambers; and, wherein the follower member is provided with recesses in the sliding surface to permit selected apertures to communicate with one another, wherein a change in position of the follower member varies which apertures can communicate with one another.

6. The vibrator of claim 5, further comprising a plurality of seals provided between the sliding surface and the cooperative surface to isolate the apertures from one another.

7. The vibrator of claim 1, wherein:

movement of the carriage in said one direction defines a faster acceleration while movement of the carriage in said other direction defines a slower acceleration; and, wherein the regulating means includes adjustable means for adjusting a ratio of the faster acceleration to the slower acceleration.

8. The vibrator of claim 2, wherein:

the base is formed from an integral block of material; and, the piston cavities are bores recessed in the opposite ends of the base on a common axis, the piston cavities defining a partition therebetween, and, the manifold includes a bore recessed in the base along an axis perpendicular to the common axis of the piston bores.

9. The vibrator of claim 8, wherein:

the base defines two flanking bores extending mutually parallel to the common axis of the piston bores and intersecting the manifold bore at spaced locations; and, the mechanism comprises a cam rod disposed in each flanking bore and a follower rod disposed in the manifold bore, the follower rod extending between and abutting against the spaced cam rods; and, wherein each cam rod defines a concavity and is interconnected to move in unison with the carriage and pistons, together the cam rods being oriented and the concavities being arranged offset relative to each other such that reciprocation of the cam rods causes the follower rod to reciprocate between the first and second positions.

10. The vibrator of claim 1, wherein:

the carriage is attached to the base by coupling means comprising at least one rail fixed to the carriage and mounted in bearings in the base.

11. The vibrator of claim 2, wherein:

the piston arrangement bears on the carriage by interconnecting means comprising spaced flange portions attached to the piston arrangement at locations on the pistons on sides of the seal opposite to the expansion chambers.

12. A method for converting compressed air power into asymmetrical vibration for transporting articles, comprising the steps of:

providing a carriage with an article-carrying surface;

providing a base coupled to the carriage, the base having spaced ends, an air inlet, an air vent, a piston cavity and a manifold;

disposing a piston arrangement in the piston cavity for movement in opposite directions, the piston arrangement bearing against the carriage;

providing a seal between the piston arrangement and the piston cavity so as to define two expansion chambers that are respectively enlarged and contracted in alternating manner with reciprocation of the piston arrangement;

extending air conduits from the manifold to each of the inlet, the vent, and the two expansion chambers;

providing a mechanism outside the expansion chambers, associated with the manifold, and operating the mechanism by movement of the pistons to vary between a first position in which one said expansion chamber communicates with the inlet and the other said expansion chamber communicates with the vent, and a second position in which said one expansion chamber communicates with the vent and said other expansion chamber communicates with the inlet, whereby the piston arrangement is reciprocated;

supplying compressed air to the inlet; and, asymmetrically regulating one of air flow into and out of the expansion chambers such that the piston arrangement moves more forcefully in one direction than in an opposite direction, whereby articles on the surface are transported in said opposite direction.

13. The method of claim 12, wherein:

the step of providing a mechanism outside the expansion chambers comprises providing a follower member having opposite ends and providing two spaced cam members flanking the follower member such that each cam member has a cam surface abutting one of the opposite ends of the follower member, wherein the cam members are elongated and interconnected to move in unison with the carriage and pistons.

14. The method of claim 13, further comprising the steps of:

providing each cam surface with a concavity; and, spacing the cam members apart and arranging the concavities offset relative to each other such that reciprocation of the cam members causes the follower member to reciprocate perpendicular to the cam members.

15. The method of claim 14, further comprising the steps of:

providing the follower member with a sliding surface between the opposite ends thereof; and, providing the manifold with a cooperative surface closely spaced from the sliding surface;

providing the cooperative surface with a plurality of apertures, each aperture being in communication with one of the inlet, the vent, and the expansion chambers;

providing a plurality of seals between the sliding surface and cooperative surface to isolate the apertures from one another; and, recessing the sliding surface in places to permit the apertures to communicate with one another such that a change in position of the follower member varies which apertures can communicate with one another.

16. The method of claim 12, wherein:

the step of regulating air flow comprises the step of adjustably throttling the air flow in at least one direction into or out of at least one of the expansion chambers.

\* \* \* \* \*